United States Patent [19]

Greub

[11] Patent Number: 4,887,953
[45] Date of Patent: Dec. 19, 1989

[54] STORAGE INSTALLATION

[75] Inventor: Bruno A. Greub, Uerikon, Switzerland

[73] Assignee: System Schultheis AG, Rapperswil, Switzerland

[21] Appl. No.: 176,619

[22] Filed: Apr. 1, 1988

[30] Foreign Application Priority Data

Apr. 14, 1987 [CH] Switzerland .......................... 1450/87

[51] Int. Cl.⁴ ............................................... B65G 1/10
[52] U.S. Cl. ..................... 414/331; 414/282; 414/280; 414/277; 198/435; 198/475.1; 198/797
[58] Field of Search ............... 414/266, 267, 277, 278, 414/279, 280, 281, 282, 283, 787, 234, 235, 236, 237, 238, 261, 264; 198/435, 475.1, 797, 800

[56] References Cited

U.S. PATENT DOCUMENTS 3,884,371  5/1975  Castro .................................. 414/234
4,595,332  6/1976  Loomer ............................ 414/282 X
4,756,657  7/1988  Kinney ............................. 414/280 X

FOREIGN PATENT DOCUMENTS 2533198  12/1984  France .
0048309   3/1984  Japan ................................. 414/280
0018606   1/1986  Japan ................................. 414/277
0023009   1/1986  Japan ................................. 414/277

Primary Examiner—Frank E. Werner
Attorney, Agent, or Firm—Laurence R. Brown; Alfred J. Mangels

[57] ABSTRACT

The installation comprises an endless circulating shelf plant which is divided into a plurality of individual endless bucket belts having run returning stations with horizontal run returning axis in a common plane. A shelf serving apparatus is located in front of this plane and can access every location of the shelves of the individual endless bucket belts which arrive in the mentioned plane. Due to the combination of the endless circulating shelves and the shelf serving apparatus the access time is substantially optimized by the installation which also utilizes the available space to its best.

4 Claims, 1 Drawing Sheet

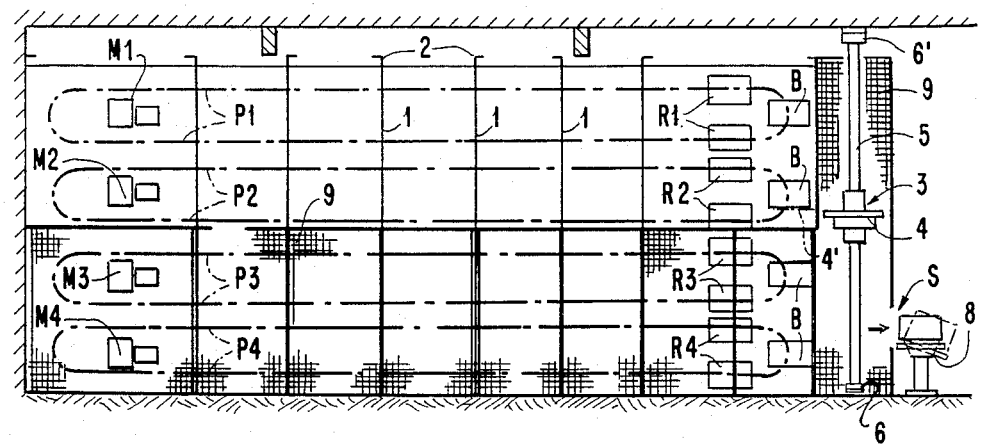
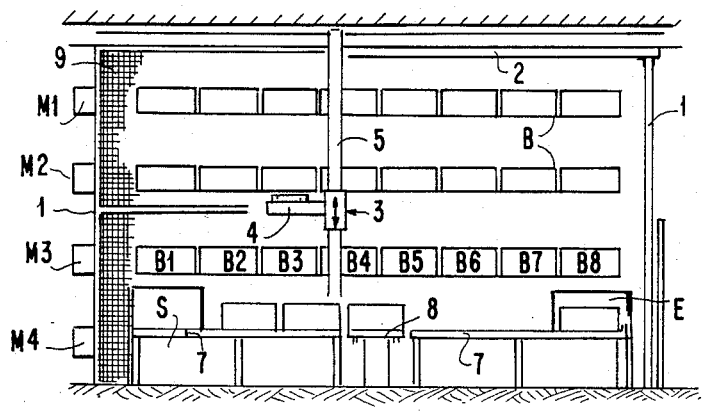
FIG. 2
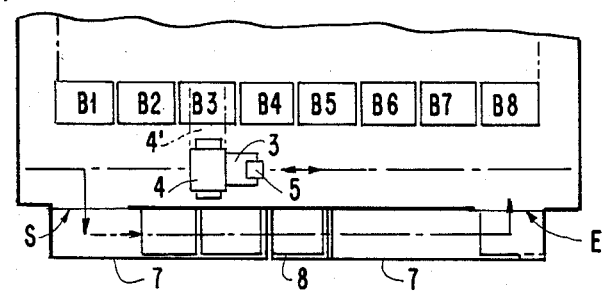
FIG. 3

STORAGE INSTALLATION

BACKGROUND OF THE INVENTION

1. Field of the Invention

The present invention relates to a storage installation having a plurality of superimposed decks of endless circulating shelf units, each endless circulating shelf unit including two run returning stations of which one respective run returning station has a run return axis located together with the respective return axis of all endless circulating shelf units in one common plane; having further a shelf serving apparatus located in front of said common plane and moveable in a plane extending parallel thereto and including means for loading and unloading at the run returning station of any respective endless circulating shelf unit.

2. Description of the Prior Art

One storage installation of this kind disclosed in the French Patent Specification FR-PS 2 533 198 is a high shelf storage arrangement including cases or boxes, resp. which are suspended on an endless conveyor moving in a horizontal plane such that they are supported in cantilevered fashion and accordingly supported by rollers and guide tracks along the entire length of the path of the endless circulating conveyor. In order to prevent the supporting forces from growing too large due to the cantilevered design of the cases each circulating conveyor must consist of two endless chains located at a distance over each other, which gives rise to rather large expenditures due to the large number of endless circulating conveyors arranged in decks over each other and aside of each other in the storage facility. The return axis of the endless circulating conveyors extend vertically, and accordingly, the endless conveyors arranged in decks above each other can be driven by one common drive and a continuous axis, in order, however, to operate the endless conveyors deckswise individual couplings between a continuous axis and individual drives for every chain must be installed at each deck which again is quite complicated. However, because Nicolle does not desire to move all endless conveyors of all decks for an access to one deck such solution of the drive must be selected.

Furthermore, this known high shelf storage facility allows only a storing of articles having dimensions which do not exceed those of the cases, the design of the entire facility does, however, not permit a storing of for instance long rod like articles because only such clearance is present between the endless circulating conveyors at a same deck which allows the cases to move past each other.

SUMMARY OF THE INVENTION

Hence, it is a general object of the present invention to provide a storage installation by means of which also specifically long articles such as bar stock, profile irons etc. can be stocked in an installation of this kind. To this end it is a further object of the invention to provide such a storage installation in which such articles to be stocked can be loaded parallel to the loading face side of the storage installation thereinto. Such an installation necessitates fundamentally a different design and a different principle of motions of the cases or boxes into which the articles to be stored are to be placed than hitherto known.

Yet a further object is to provide a storage installation which specifically at the run return station has a less intrinsic design and does not comprise cantilevered cases which must be hung, or hooked on, and which storage installation is stable regarding the load yet demands less expenditures regarding its design.

Still a further object is to provide a storage installation having a plurality of superimposed decks of endless circulating shelf units in which each endless circulating shelf unit comprises an endless circulating conveyor guided along two vertically superimposed runs and has a horizontal run returning axis which axes are arranged to be driven individually at ever deck.

The advantage of the horizontally arranged run return axes of the endless circulating conveyor is that the cases located thereon for receipt of the storage articles move vertically at the run returning station and have thereby their breadth extending parallel to the face side of the storage installation, in front of which the shelf serving apparatus is moveable in a vertical plane such that no restrictions regarding the width of the utilized cases, gondolas or platforms for receipt of the articles of storage are encountered.

By means of an endless circulating conveyor which moves in a vertical plane along an upper and a lower run the load may be supported and more easily balanced. At the run returning station located at the head and at the serving side a horizontal run returning axis is provided at every deck, which axes accordingly can quite easily be driven individually.

According to a preferred embodiment the shelf serving apparatus which is moveable simultaneously vertically and horizontally is designed as a vertical elevator with a laterally telescope like extendable receiving table.

Preferably, a store delivery station and a store up station are located in front of the plane of movement of the shelf serving apparatus and at the side opposite of the circulating shelf units, which both stations are located at an arbitrarily selectable height above the ground, since the storage articles to be transferred at those stations can be brought by a shelf serving apparatus which is movable in an unrestricted space also down up to a lowermost deck of the storage installation.

BRIEF DESCRIPTION OF THE DRAWINGS

The invention will be better understood and objects other than those set forth above, will become apparent when consideration is given to the following detailed description thereof. Such description makes reference to the annexed drawings, wherein:

FIG. 1 illustrates, on a schematic basis only, a storage installation in accordance with the present invention;

FIG. 2 illustrates a front face view of the installation of FIG. 1; and

FIG. 3 illustrates a top view of the front face side of the installation of FIG. 1.

DETAILED DESCRIPTION OF THE PREFERRED EMBODIMENT

The drawing illustrates a storage installation in which four individual horizontal endless bucket belts $P_1$, $P_2$, $P_3$ and $P_4$ are arranged in a frame work of steel girders 1, 2. Each endless bucket belt includes two horizontally extending runs along which a plurality of shelfs (here e.g. in form of gondolas) $R_1$, $R_2$, $R_3$, $R_4$ can be moved by means of a endless load chain.

In the illustrated example every endless bucket belt can be provided with about 20 shelves. On every shelf a plurality of removable or possibly exchangeable containers (or palettes) $B_1$-$B_8$ can be placed at predetermined, i.e. controlled accessible sectors for receipt of the articles to be stored.

Every endless bucket belt $P_1$-$P_4$ is arranged to be driven individually by a respective drive motor $M_1$-$M_4$, possibly including an associated gear. The run returning stations of the various endless bucket belts $P_1$-$P_4$ are located at one head end of the storage installation substantially in a common vertical plane into which every shelf can be controlled to be unloaded or loaded.

At this head end now, a shelf serving apparatus 3 having the form of a vertical elevator is foreseen. The apparatus 3 includes a table 4 which is provided with laterally telescopically extendable extensions 4', which can retrieve a palette or a container B out of the shelf or place such in such shelf. The table 4 is movable along a vertical guide 5 by motor drive. The entire apparatus 3, consisting of the table 4, drive motors, vertical guide etc. is horizontally movable in rails 6, 6. Due to this arrangement the table 4 of the shelf servicing apparatus 3 can be brought to any desired place in front of the shelves of the endless bucket belts $P_1$-$P_4$ at mentioned head end of the storage installation (generally by means of completely electronical, computer controlled apparatuses). A corresponding control means brings, furthermore, the selected shelf which is located in an arbitrary endless bucket belt $P_1$-$P_4$ to the head end.

A storage article received by the apparatus 3 (case B) is then transported to a central store delivery station S where such article arrives on a store delivery table 7. A tilting station 8 may possibly be arranged in this table such to facilitate a loading and unloading, resp. of a container containing storage articles.

Usually also a store up station E is arranged at the same head end of the storage installation, via which articles to be stored (containers, palettes) are brought by means of the apparatus 3 into the next accessible shelf. Obviously, the respective storage place is stored in a computer such to be ready for a recall.

As a rule, the storage installation is protected at least in part by a grating or screen 9, resp. such to avoid accidents by possibly dropping articles.

By the illustrated installation, in which obviously also other configurations of the individual endless bucket belts may be foreseen, the advantage of the endless bucket belt technique utilizing the available space to the fullest extent can be taken advantage of without having to suffer the drawbacks of a possibly excessive long access time. The space required for the additional shelf serving apparatus is minimal.

I claim:

1. A storage installation having a plurality of superimposed decks of endless circulating shelf units, each endless circulating shelf unit including two run returning stations passing about horizontally extending axes of which one respective run returning station has a run return axis located together with the respective return axes of all other endless circulating shelf units in one common plane; having further a shelf serving apparatus located adjacent said common plane and movable horizontally in a loading and unloading plane extending parallel thereto and including vertically movable means for loading and unloading at the run returning station of any respective endless circulating shelf unit from any one of said plurality of decks;

each endless circulating shelf unit comprising an endless circulating conveyor guided along two vertically superimposed runs to move the circulating shelf units vertically in and out of said loading and unloading plane into a position for loading and unloading the shelf units at an open leading end parallel to said plane by said shelf serving apparatus and having separately operable drive means for each of said horizontal run returning axes at every deck.

2. The storage installation of claim 1, in which said shelf serving apparatus is designed as vertical elevator for transporting unloaded shelf units to an article receiving table which tilts laterally to facilitate unloading.

3. The storage installation of claim 1, including a loading and unloading station comprising a store delivery station and a store up station located within a range of horizontal movement of said shelf serving apparatus on one side of the plane of movement of said shelf serving apparatus opposite to the endless circulating shelf units, and means for moving the shelf serving apparatus horizontally between both the store delivery and store up station served by said shelf serving apparatus.

4. The storage installation of claim 1, in which said plurality of superimposed decks of endless circulating shelf units have arranged horizontally side-by-side thereon a plurality of removable containers, and wherein said shelf serving apparatus is movable horizontally in said plane to unload selected ones of said plurality of removable containers.

* * * * *